June 4, 1929.  P. G. GRIFFITH  1,715,356
GASKET OR WASHER
Filed Oct. 11, 1927
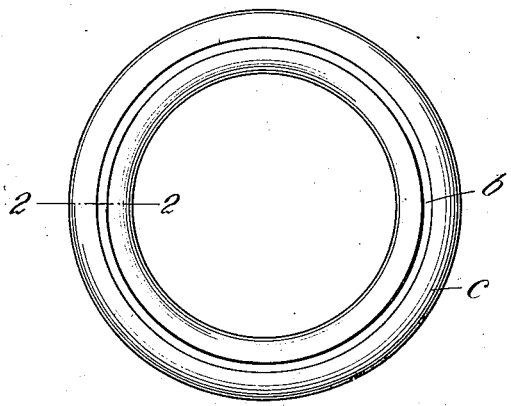
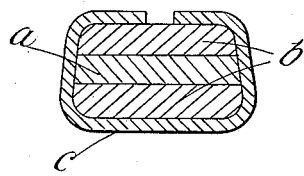
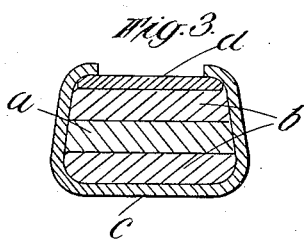
Inventor.
Patrick G. Griffith
M. H. Lockwood
Attorney.

Patented June 4, 1929.

1,715,356

UNITED STATES PATENT OFFICE.

PATRICK GILL GRIFFITH, OF WALTON-ON-THAMES, ENGLAND, ASSIGNOR TO J. PAYEN LIMITED, OF CHURCH WHARF, LONDON, ENGLAND, A BRITISH COMPANY.

GASKET OR WASHER.

Application filed October 11, 1927, Serial No. 225,457, and in Great Britain January 13, 1927.

This invention relates to gaskets or washers, such as are employed for making fluid-tight joints and comprising resilient material interposed between two layers of protective material such as thin sheet metal and has for its object an improved washer adapted especially to withstand the action of lubricating oil, paraffin or petrol.

The improved washer of this invention comprises in its simplest form a layer of resilient material interposed between two layers of tougher material the whole being provided with a covering of protective material such as thin sheet metal. For example, a ring of cork may be interposed between two layers of compressed fibre and the whole enclosed in a covering of thin sheet lead, said covering being in either one or two pieces according to the width and size of the washer. In some cases more than three layers of material may be arranged within the covering and as examples of the tougher material, vulcanized fibre, leather, hard felt, and compressed paper may be mentioned whilst agglomerated cork may be used for the resilient material and lead, copper or like comparatively soft metal in thin sheet form may be employed for the covering.

The invention is illustrated by the accompanying drawings wherein Figure 1 is a face view of one form of washer, and Figure 2 is an enlarged cross section on the line 2—2, Figure 1, whilst Figure 3 is a similar view to Figure 2 showing a modification.

In the form of the invention shown in Figures 1 and 2 a ring $a$ of cardboard or like compressible material is arranged between two rings $b$, $b$ of vulcanized fibre and the whole is enclosed by a covering $c$ of thin sheet lead alloy.

The covering $c$ may consist of a single piece of metal folded over the flat surfaces and the inner and outer peripheries of the washer as illustrated in Figures 1 and 2, or it may consist of two pieces $c$ and $d$ one, $d$, in the form of a flat washer lying on one of said flat surfaces, whilst the other, $c$, lies on the other of said flat surfaces and its margins are folded over the inner and outer peripheries of the washers so as to overlie the inner and outer margins of the piece $d$.

It has been found that the improved washer is capable of standing considerable pressure without being destroyed and that the metal covering $c$ prevents the contamination of liquid (e. g. in vessels or pipes in connection with which the improved washer is employed) which would otherwise take place by the fibre of the ordinary washer made of leather, vulcanized fibre or the like.

I claim:—

A gasket or washer comprising a layer of cardboard, a layer of vulcanized fibre on each side of said cardboard layer and a protective covering therefor of thin sheet lead alloy.

PATRICK GILL GRIFFITH.